(12) United States Patent
Porterfield et al.

(10) Patent No.: US 9,309,981 B2
(45) Date of Patent: Apr. 12, 2016

(54) POPPET VALVE WITH A FRANGIBLE SEALING DISC FOR A PRESSURE VESSEL

(71) Applicant: Kidde Technologies, Inc., Wilson, NC (US)

(72) Inventors: John W. Porterfield, Raleigh, NC (US); Harlan B. Hagge, Knightdale, NC (US); David Frasure, Wilson, NC (US); Adam Chattaway, Berkshire (GB); Michael C. Miller, Wilson, NC (US)

(73) Assignee: Kidde Technologies, Inc., Wilson, NC (US)

( * ) Notice: Subject to any disclaimer, the term of this patent is extended or adjusted under 35 U.S.C. 154(b) by 129 days.

(21) Appl. No.: 14/164,529

(22) Filed: Jan. 27, 2014

(65) Prior Publication Data

US 2015/0107685 A1    Apr. 23, 2015

Related U.S. Application Data

(60) Provisional application No. 61/892,631, filed on Oct. 18, 2013.

(51) Int. Cl.
| | |
|---|---|
| *F16K 17/40* | (2006.01) |
| *F16K 17/14* | (2006.01) |
| *F17C 13/04* | (2006.01) |
| *F16K 17/16* | (2006.01) |
| *F16K 1/30* | (2006.01) |
| *A62C 13/64* | (2006.01) |
| *A62C 3/08* | (2006.01) |

(52) U.S. Cl.
CPC .................. *F16K 17/14* (2013.01); *A62C 13/64* (2013.01); *F16K 1/30* (2013.01); *F16K 13/06* (2013.01); *F16K 17/16* (2013.01); *F17C 13/04* (2013.01); *A62C 3/08* (2013.01); *Y10T 137/1782* (2015.04)

(58) Field of Classification Search
CPC ......... F16K 17/14; F16K 13/06; F16K 17/16; F16K 13/04; A62C 3/08; A62C 13/64; Y10T 137/1782; F17C 13/04
USPC ................ 137/68.23, 70, 69; 279/2.1, 50, 57; 220/89.2
See application file for complete search history.

(56) References Cited

U.S. PATENT DOCUMENTS

| | | | | |
|---|---|---|---|---|
| 3,042,418 A | * | 7/1962 | Sorsa et al. ...................... 279/50 |
| 3,168,322 A | * | 2/1965 | Dziedzic ...................... 279/4.09 |

(Continued)

FOREIGN PATENT DOCUMENTS

EP    0862004 A2    9/1998

OTHER PUBLICATIONS

European Search Report dated Apr. 20, 2015, issued on corresponding European Patent Application No. 14188852.9.

*Primary Examiner* — John K Fristoe, Jr.
*Assistant Examiner* — Umashankar Venkatesan
(74) *Attorney, Agent, or Firm* — Locke Lord LLP; Scott D. Wofsy; Joshua L. Jones

(57) ABSTRACT

A valve assembly for a pressure vessel is disclosed that includes a valve housing operatively associated with an outlet of the pressure vessel, a frangible hermetic disc sealing the outlet of the pressure vessel, and a poppet valve mounted for movement within the valve housing between a first position supporting the frangible hermetic disc within the outlet of the pressure vessel and a second position spaced apart from the frangible hermetic disc to permit the frangible disc to burst under pressure and permit the egress of pressurized material from the pressure vessel through the outlet.

4 Claims, 3 Drawing Sheets

(56) References Cited

U.S. PATENT DOCUMENTS

| | | |
|---|---|---|
| 4,149,565 A | 4/1979 | Jennings et al. |
| 4,159,744 A | 7/1979 | Monte et al. |
| 4,520,838 A * | 6/1985 | Fisher et al. .................. 137/69 |
| 6,053,256 A | 4/2000 | Lu |
| 6,431,196 B1 | 8/2002 | Brazier et al. |
| 7,270,140 B2 | 9/2007 | Aderholt et al. |
| 7,434,628 B2 | 10/2008 | Scheidt |
| 8,496,021 B2 | 7/2013 | Sandiford |

\* cited by examiner

POPPET VALVE WITH A FRANGIBLE SEALING DISC FOR A PRESSURE VESSEL

CROSS-REFERENCE TO RELATED APPLICATION

This application claims the benefit of priority to U.S. Provisional Patent Application No. 61/892,631 filed Oct. 10, 2013 which is incorporated by reference herein in its entirety.

BACKGROUND OF THE INVENTION

1. Field of the Invention

The subject invention relates generally to a valve assembly for a pressure vessel, and more particularly, to a valve assembly for a pressure vessel containing a fire extinguishing agent used on an aircraft that includes a low pressure frangible seal supported by a poppet valve.

2. Description of Related Art

Firefighting in commercial and military aircraft often requires equipment which uses compressed fire extinguishing agents, such as halons, halon alternatives, or similar materials. These fire extinguishing agents are stored in suitable containers under a pressure of between 300-1200 psi, depending upon the application.

Some of these containers have an outlet that is closed with a leak-tight frangible closure membrane or rupture disc, as disclosed for example, in U.S. Pat. No. 7,434,628 to Scheidt. The closure membrane permits the container to be fluidly connected to a distribution pipe system by destroying the membrane, for example by igniting a pyrotechnical device. As soon as the membrane is destroyed by the pyrotechnical device, the fire extinguishing agent flows through the pipe system to an enclosed space where a fire has started.

A nozzle connected to the discharge end of the pipe system distributes the fire extinguishing agent in the enclosed space to suppress the fire. The pyrotechnical device is usually remote controlled through an electrical switch located in the cockpit of the aircraft. Fire detectors are installed in the enclosed space and provide a warning signal in the cockpit so that the release of the fire extinguishing agent can be immediately triggered by a crew member or automatically.

Because the fire extinguishing agent is maintained under pressure, the frangible closure membrane is continuously under stress and therefore susceptible to opening inadvertently, and thereby releasing the fire extinguishing agent prematurely or otherwise unnecessarily, at great expense.

It would be beneficial therefore, to provide a mechanism for supporting a frangible closure membrane or rupture disc while it is under pressure, to prevent the inadvertent or otherwise premature release of fire extinguishing agent from a pressure vessel. It would also be beneficial to remove the pyrotechnical device from the system, since it requires special handling and shipping.

SUMMARY OF THE INVENTION

The subject invention is directed to a new and useful valve assembly for a pressure vessel. The valve assembly includes a valve housing operatively associated with an outlet of the pressure vessel, a frangible (readily broken) hermetic disc sealing the outlet of the pressure vessel, and a poppet valve mounted for movement within the valve housing between a first position supporting the frangible hermetic disc within the outlet of the pressure vessel and a second position spaced apart from the frangible hermetic disc to permit the frangible hermetic disc to burst under pressure and permit the egress of pressurized material from the pressure vessel through the outlet.

The poppet valve includes a cylindrical head portion and an elongated valve stem extending downwardly from the head portion and defining a longitudinal axis. The head portion of the poppet valve includes an upper contact surface that contacts the frangible hermetic seal when the poppet valve is in the first position. In doing so, the poppet advantageously prevents the disc from rupturing.

The frangible hermetic disc is comprised of a metallic foil configured to rupture under pressure. The valve housing includes an exit port for the egress of pressurized material from the pressure vessel. The head portion of the poppet valve includes a pair of axially spaced apart annular channels for accommodating a pair of axially spaced apart O-ring seals, that are adapted and configured to seal the outlet of the pressure vessel, below the frangible hermetic seal.

The valve assembly further includes a locking mechanism for releasably securing the poppet valve in the first position, and an actuation mechanism for releasing the locking mechanism, to allow the poppet valve to move from the first position to the second position under pressure from the pressure vessel.

The locking mechanism includes a cylindrical extension that depends downwardly from the lower end of the valve stem of the poppet valve. An annular retention slot is formed in a lower end portion of the cylindrical extension. The locking mechanism further includes a generally cylindrical collet associated with the valve housing and surrounding the cylindrical extension of the valve stem. The collet includes an annular retainer ring adapted and configured to releasably engage the annular retention slot in the extension of the valve stem.

A lock ring is operatively associated with the actuation mechanism and it includes an annular wall for maintaining the retainer ring of the collet in the retention slot of the valve stem extension when the poppet valve is in the first position. The valve assembly further includes a coiled spring located within the valve housing, below the lock ring, for biasing the lock ring toward the first position of the poppet valve.

The actuation mechanism further includes a piston, disposed at least partially within the valve stem, for driving the lock ring against the coiled spring to clear the annular wall of the lock ring away from the retainer ring of the collet, and thereby permitting the retainer ring of the collet to disengage from the retention slot in the valve stem extension.

The collet includes a plurality of circumferentially spaced apart longitudinal slots defining a plurality of circumferentially spaced apart deflectable locking fingers, wherein each locking finger includes a portion of the annular retainer ring. The deflectable locking fingers each include a radially outwardly projecting rib positioned to bear against the annular wall of the lock ring when the poppet valve is in the first position.

The subject invention is also directed to a valve assembly for a pressure vessel that includes, among other things, a frangible disc hermetically sealing an opening of the pressure vessel and configured to rupture under pressure, and a valve member mounted for movement between a locked position in which a contact surface of the valve member supports the frangible disc within the opening of the pressure vessel to prevent the disc from rupturing and an unlocked position in which the contact surface of the valve member is spaced apart from the frangible disc to permit the frangible disc to rupture under pressure and permit the egress of pressurized material from the pressure vessel through the outlet.

The valve assembly further includes a valve housing operatively associated with the outlet of the pressure vessel and supporting the movement of the valve member between the locked and unlocked positions. The valve housing contains a locking mechanism for releasably securing the valve member in the locked position, and an actuation mechanism is provided for releasing the locking mechanism to allow the valve member to move from the locked position to the unlocked position.

These and other features of the valve assembly of the subject invention and the manner in which it is constructed and employed in a fire detection system will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art will readily understand how to make and use the valve assembly of the subject invention without undue experimentation, embodiments thereof will be described in detail herein below with reference to certain figures, wherein.

DETAILED DESCRIPTION OF PREFERRED EMBODIMENTS

Figure 1:
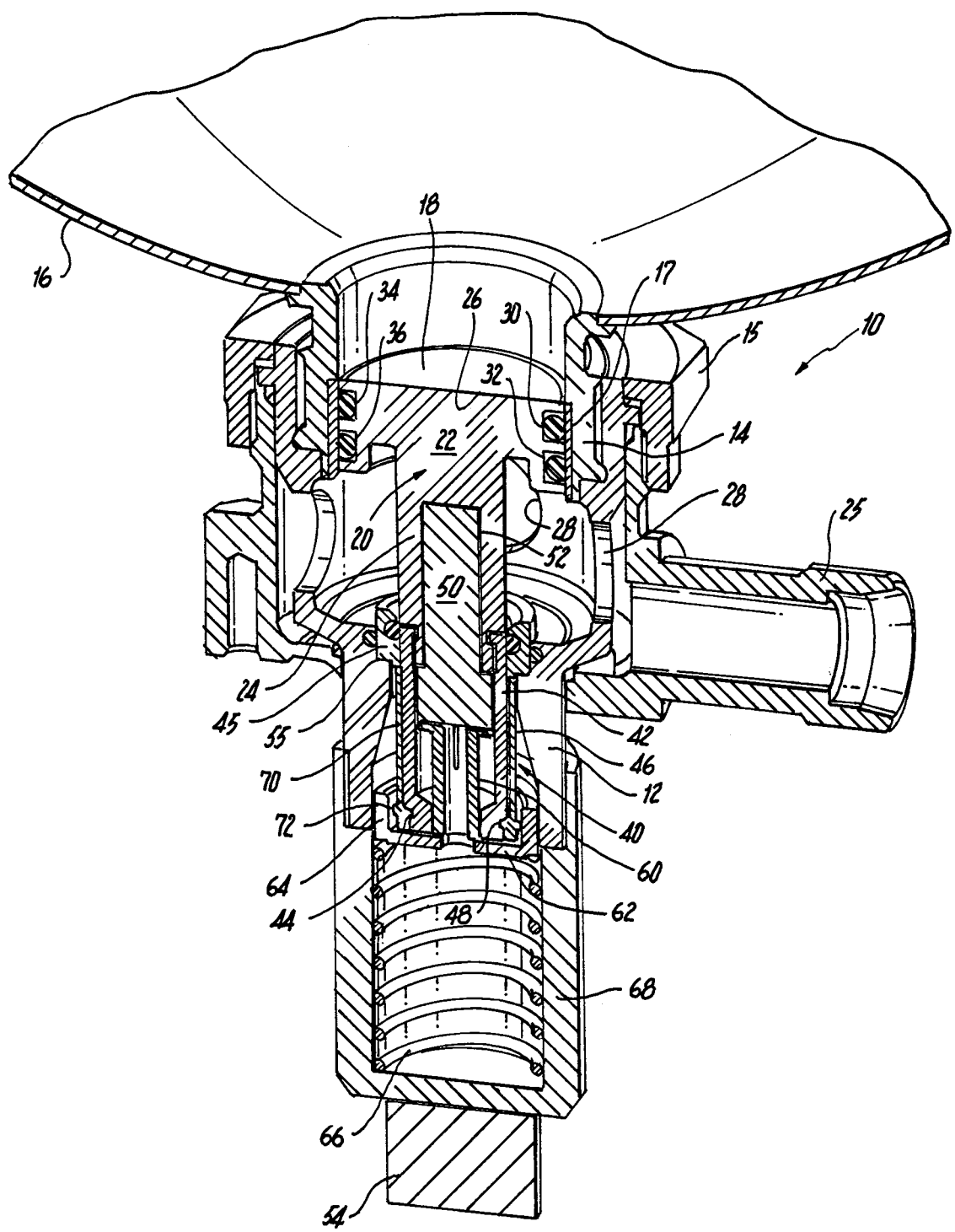
FIG. 1 is a perspective view of the valve assembly of the subject invention, in partial cross-section, illustrating the internal components of the valve assembly in a steady-state condition, wherein the poppet valve is secured in a closed position by the internal actuation piston, supporting the hermetic disc that seals the pressure vessel.

Referring now to the drawings, there is illustrated in FIG. 1, a valve assembly for a pressure vessel constructed in accordance with a preferred embodiment of the subject invention and designated generally by reference numeral 10.

Referring to FIG. 1, valve assembly 10 includes a valve housing 12 that is operatively connected with an outlet opening 14 of a pressure vessel 16. In an embodiment of the subject invention, the pressure vessel 16 contains a fire extinguishing agent, such as Halon or the like, and is configured for use on commercial and military aircraft. It is envisioned however, that the novel valve assembly 10 of the subject invention could be readily utilized in other applications and operating environments, including those that are unrelated to firefighting in aircraft.

Valve assembly 10 further includes a frangible (i.e., readily broken) disc 18 that seals the outlet opening 14 of the pressure vessel 16. The frangible disc 18 provides a hermetic seal for the pressure vessel 16. The frangible disc is preferably formed from a metallic foil that is adapted and configured to rupture under pressure, such as, for example, aluminum foil or a similar material. The outer periphery of the frangible disc 18 is associated with a support ring 17 that is brazed or otherwise joined to the inner wall of the outlet opening 14 of pressure vessel 16.

Figure 3:
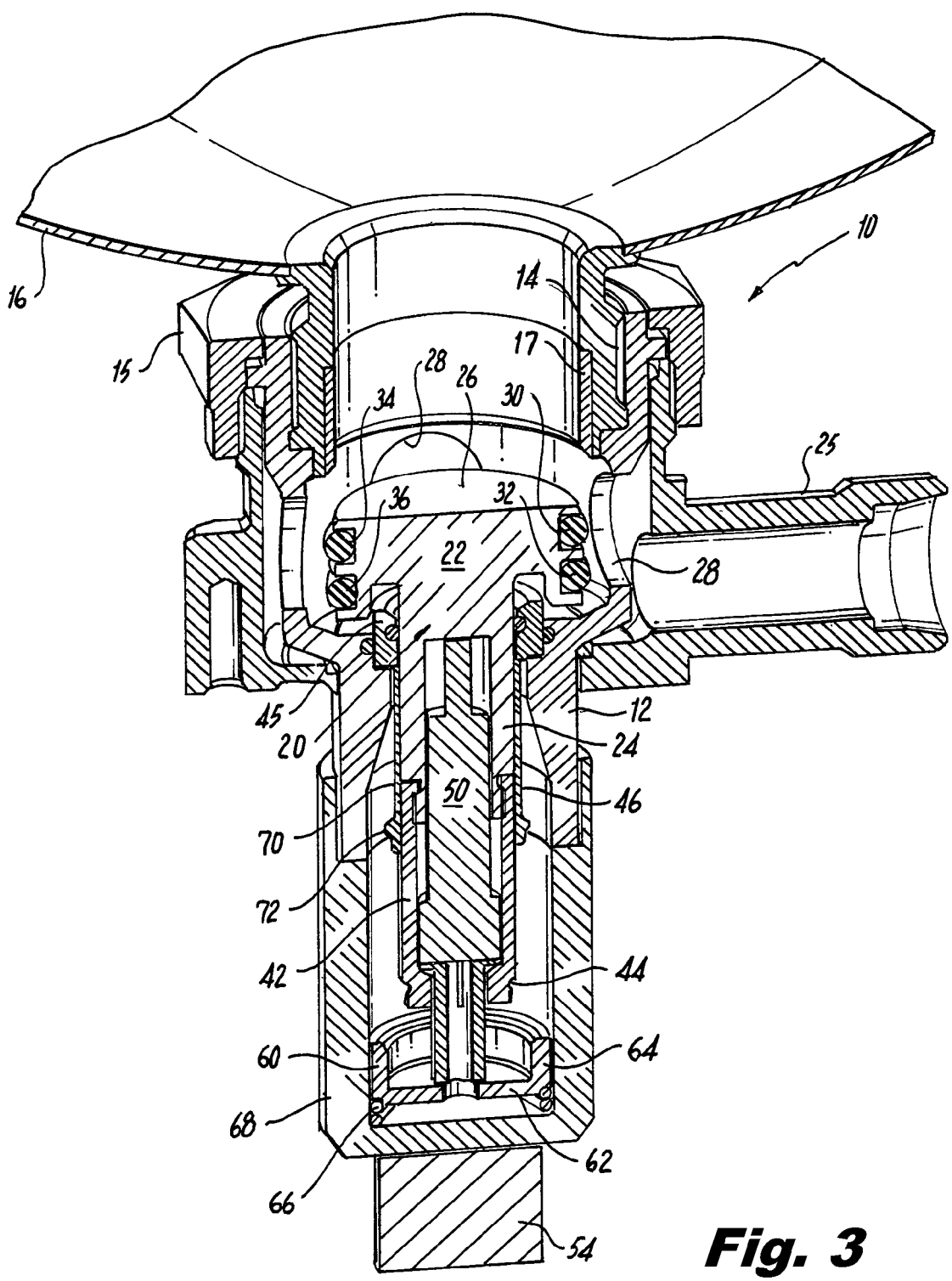
FIG. 3 is a perspective view of the valve assembly of the subject invention, in partial cross-section, illustrating the internal components of the valve assembly upon movement of the poppet valve into an open position, allowing the low pressure hermetic sealing disc to burst, to permit the egress of pressurized material from the pressure vessel.

With continuing reference to FIG. 1, a poppet valve 20 is mounted for axial movement within the valve housing 12 between a first position supporting the frangible disc 18 within the outlet opening 14 of the pressure vessel 16, and a second position spaced apart from the frangible disc 18 to permit the frangible disc 18 to burst under pressure and thereby permit the egress of pressurized material from the pressure vessel 16 through the outlet opening 14, as discussed in more detail below with respect to FIG. 3.

The poppet valve 20 includes a cylindrical head portion 22 and an elongated valve stem 24 which depends from the head portion 22 and defines a longitudinal axis. The head portion 22 of poppet valve 20 includes a substantially planar, upper contact surface 26. The contact surface 26 of the head portion 22 intimately contacts the frangible disc 18 when the poppet valve 20 is in the first position, as best seen in FIG. 1. In doing so, the poppet valve 20 advantageously prevents the pressure that is acting on the other side of the disc 18 from rupturing the disc, and causing the premature or otherwise unnecessary release of the pressurized material from the pressure vessel 16.

The valve housing 12 includes a plurality of exit ports 28 for conducting the egress of pressurized material from the pressure vessel 16 to an outlet fitting 25 connected to a piping system (not shown), when the valve assembly 10 is opened, as discussed in more detail below. The outlet fitting 25 is secured to the valve housing 12 by coupling 15.

The head portion 22 of the poppet valve 20 includes a pair of axially spaced apart annular channels 30 and 32 for accommodating a pair of axially spaced apart O-ring seals 34 and 36, respectively. The O-ring seals 34 and 36 are adapted and configured to fluidly seal the outlet opening 14 of pressure vessel 16, below the frangible disc 18.

The valve assembly 10 further includes a locking mechanism 40 for releasably securing the poppet valve 20 in the first position shown in FIG. 1, and an axially movable actuation piston 50 for releasing the locking mechanism 40 from the first position. The actuation piston 50 resides at least partially within a bore 52 formed within the valve stem 24. The selective, manual or automatic release of the actuation piston 50 allows the poppet valve 20 to move from the first position shown in FIG. 1 to the second position shown in FIG. 3, under pressure from the pressure vessel 16.

The actuation piston 50 can be actuated or otherwise driven axially within the central bore 52 of valve stem 24 in a number of different ways. For example, a pyrotechnic pressurized charge could be stored within the valve stem 24 of the poppet valve 20 adjacent the upper end of the piston 50 to drive the piston 50 downward upon activation. Alternatively, the actuation piston 50 could be configured as an electrically activated solenoid mechanism, as an electrically activated linear drive mechanism or as a mechanically activated spring loaded drive mechanism. To the extent that the actuation piston 50 is electrically actuated, rather than actuated pyrotechnically, an electrical connector 54 is provided at the bottom end of the valve housing 12.

The locking mechanism 40 includes a generally cylindrical extension 42 that is connected to and depends from the valve stem 24 of poppet valve 20. The valve stem extension 42 has a radially inwardly extending annular retention slot 44 formed in a lower end portion thereof.

The locking mechanism 40 further includes a generally cylindrical collet 46 that is operatively associated with the valve housing 12 and surrounds the cylindrical valve stem extension 42. The collet 46 has an upper shoulder or flange portion 45 that is seated within an accommodation 55 formed in the valve housing 12. The collet 46 also includes a radially inwardly projecting retainer ring 48 that is adapted and configured to releasably engage the annular retention slot 44 formed in the lower end portion of valve stem extension 42. This engagement between the retainer ring 48 and the retention slot 44 secures the poppet valve 20 in the first position under steady state conditions.

A plunger 60 is positioned adjacent the lower end of the actuation piston 50. The plunger 60 transfers the force of the piston 50 to a lock ring 62 that has an upstanding annular wall 64. The annular wall 64 of lock ring 62 is dimensioned and configured to interact with and forcibly maintain the retainer ring 48 of collet 46 within the retention slot 44 of the stem extension 42, when the poppet valve 20 is in the first position.

The valve assembly 10 further includes a coiled spring 66 located within a lower portion 68 of the valve housing 12, below the base the lock ring 62. The spring 66 is adapted to bias the lock ring 62 toward the first position, so the collet 42 will not release and allow the poppet valve 20 to move from the first position.

The collet 46 also includes a plurality of circumferentially spaced apart deflectable locking fingers 70, each including a portion of the annular retainer ring 48. The deflectable locking fingers 70 also each include a radially outwardly projecting rib 72 positioned to bear against the upstanding annular wall 64 of the lock ring 62 when the poppet valve 20 is in the first position.

Figure 2:
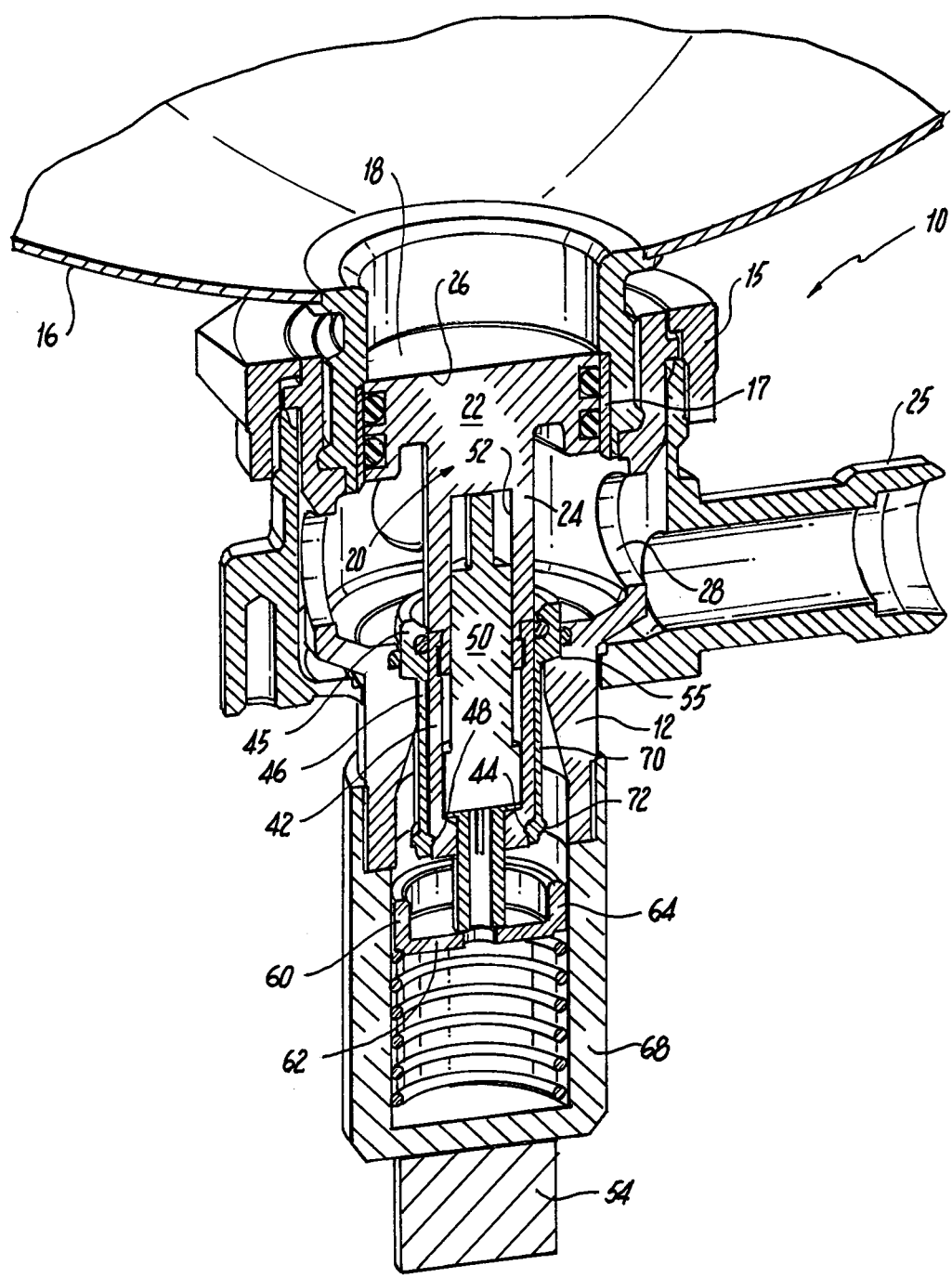
FIG. 2 is a perspective view of the valve assembly of the subject invention, in partial cross-section, illustrating the internal components of the valve assembly upon actuation of the internal piston that secures the poppet valve in a closed position.

Referring now to FIG. 2, the valve assembly 10 is shown upon actuation of the internal actuation piston 50 that secures the poppet valve 20 in a closed position. When the piston 50 is actuated it moves in a downward axial direction within the bore 52 formed in valve stem 24. The plunger 60, which is adjacent to the actuation piston 50, is also driven axially downward, against the bias of coiled spring 66.

At such a time, the upstanding annular wall 64 of lock ring 62 moves away from the radially outwardly projecting ribs 72 of the deflectable fingers 70 of collet 46. Thereupon, the pressurized material within the pressure vessel 16 is free to act upon the head portion 22 of the poppet valve 20, and hence the frangible disc 18.

Referring to FIG. 3, upon the movement of the lock ring 60 away from the outwardly projecting ribs 72 of the deflectable fingers 70, the poppet valve 20 will be free to move within the valve housing 12 against the bias of spring 66, from the first position shown in FIG. 1 to the second position shown in FIG. 3, driving the poppet 20 in an axial direction relative to the surrounding collet 46.

Because the fingers 70 of collet 46 are not strong enough to support the poppet 20 and valve stem extension 24 under these conditions, the locking edges of the retainer ring 48 of collet 46 will be spread out of engagement with the retention slot 44 in the extension 42, thereby permitting the poppet 20 to move to its full open position under the pressure of the pressurized material that has been released from the pressure vessel 16, which is shown in FIG. 3.

It should be appreciated that once the annular wall 64 of the lock ring 62 has moved away from the ribs 72 to permit the poppet valve 20 to move freely within the valve housing 12, the upper planar surface 26 of the head portion 22 of the poppet valve 20 is no longer in a position to support the frangible disc 18, and the disc 18 will therefore burst under the pressure of the pressurized material contained within the pressure vessel 16. As a result, the pressurized material within the pressure vessel 16 will discharge from the opening 14 of the pressure vessel 16.

While the subject invention has been shown and described with reference to a preferred embodiment, those skilled in the art will readily appreciate that various changes and/or modifications may be made thereto without departing from the spirit and scope of the subject invention as defined by the appended claims.

What is claimed is:

1. A valve assembly for a pressure vessel, comprising:
    a valve housing operatively associated with an outlet of the pressure vessel;
    a frangible disc sealing the outlet of the pressure vessel;
    a poppet valve mounted for movement within the valve housing between a first position supporting the frangible disc within the outlet of the pressure vessel and a second position spaced apart from the frangible disc to permit the frangible disc to burst under pressure and permit the egress of pressurized material from the pressure vessel through the outlet, wherein the poppet valve includes a cylindrical head portion and an elongated valve stem depending from the head portion and defining a longitudinal axis;
    a locking mechanism for releasably securing the poppet valve in the first position, wherein the locking mechanism includes a valve stem extension having an annular retention slot formed in an outer periphery thereof, wherein the locking mechanism further includes a collet associated with the valve housing and surrounding the valve stem extension, the collet including a radially inwardly projecting retainer ring adapted and configured to releasably engage the annular retention slot in the valve stem extension;
    an actuation mechanism for releasing the locking mechanism, to allow the poppet valve to move from the first position to the second position under pressure from the pressure vessel; and
    a lock ring operatively associated with the actuation mechanism through a plunger, the lock ring including an upstanding annular wall for maintaining the retainer ring of the collet in the retention slot of the valve stem extension when the poppet valve is in the first position, wherein the collet includes a plurality of circumferentially spaced apart deflectable locking fingers each including a portion of the annular retainer ring, and wherein the deflectable locking fingers each include a radially outwardly projecting rib positioned to bear against the annular wall of the lock ring when the poppet valve is in the first position.

2. A valve assembly as recited in claim 1, wherein the head portion of the poppet valve includes an upper contact surface that contacts the frangible disc when the poppet valve is in the first position.

3. A valve assembly as recited in claim 1, further comprising a coiled spring located within the valve housing, below the lock ring, for biasing the lock ring toward the first position.

4. A valve assembly as recited in claim 3, wherein the actuation mechanism includes a piston, disposed at least partially within the valve stem and communicating with the plunger, for driving the lock ring against the coiled spring to clear the annular wall of the lock ring away from the retainer ring of the collet, and thereby permitting the retainer ring to disengage from the retention slot of the valve stem extension.

* * * * *